No. 606,909. Patented July 5, 1898.
H. A. BARNARD.
RICE HULLING AND POLISHING MACHINE.
(Application filed Sept. 13, 1897.)
(No Model.) 5 Sheets—Sheet 1.

Witnesses  
Inventor  
Heman A. Barnard  
by Alexander & Dowell  
His Attorneys

No. 606,909. Patented July 5, 1898.
H. A. BARNARD.
RICE HULLING AND POLISHING MACHINE.
(Application filed Sept. 13, 1897.)
(No Model.) 5 Sheets—Sheet 2.
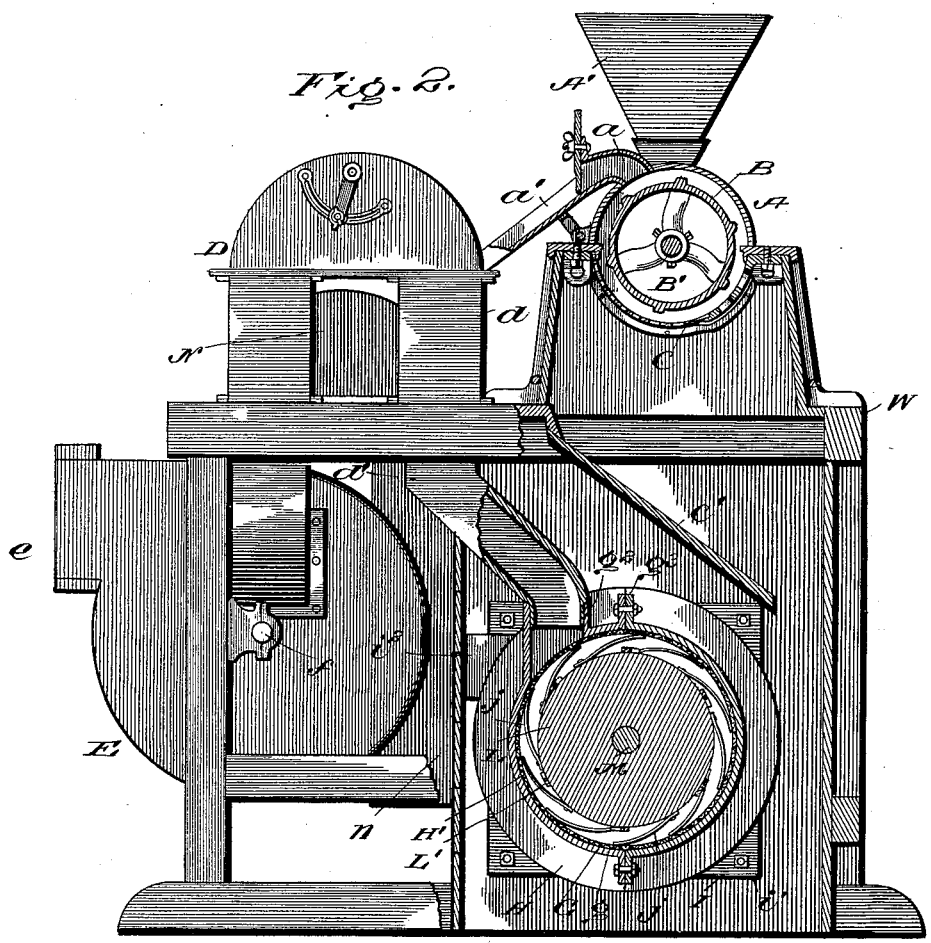
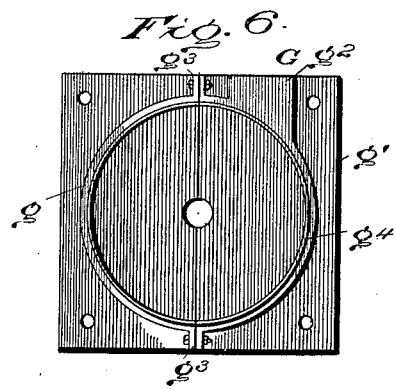
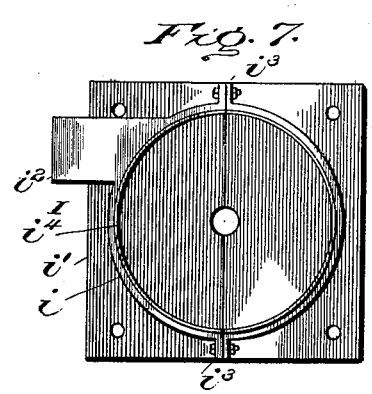
Witnesses
Inventor
Heman A. Barnard
by Alexander & Davell
his Attorneys
THE NORRIS PETERS CO., PHOTO-LITHO., WASHINGTON, D. C.

No. 606,909. Patented July 5, 1898.
H. A. BARNARD.
RICE HULLING AND POLISHING MACHINE.
(Application filed Sept. 13, 1897.)
(No Model.) 5 Sheets—Sheet 3.

Witnesses

Inventor
Heman A. Barnard
by Alexander & Dowell
His Attorneys

No. 606,909. Patented July 5, 1898.
H. A. BARNARD.
RICE HULLING AND POLISHING MACHINE.
(Application filed Sept. 13, 1897.)
(No Model.) 5 Sheets—Sheet 4.
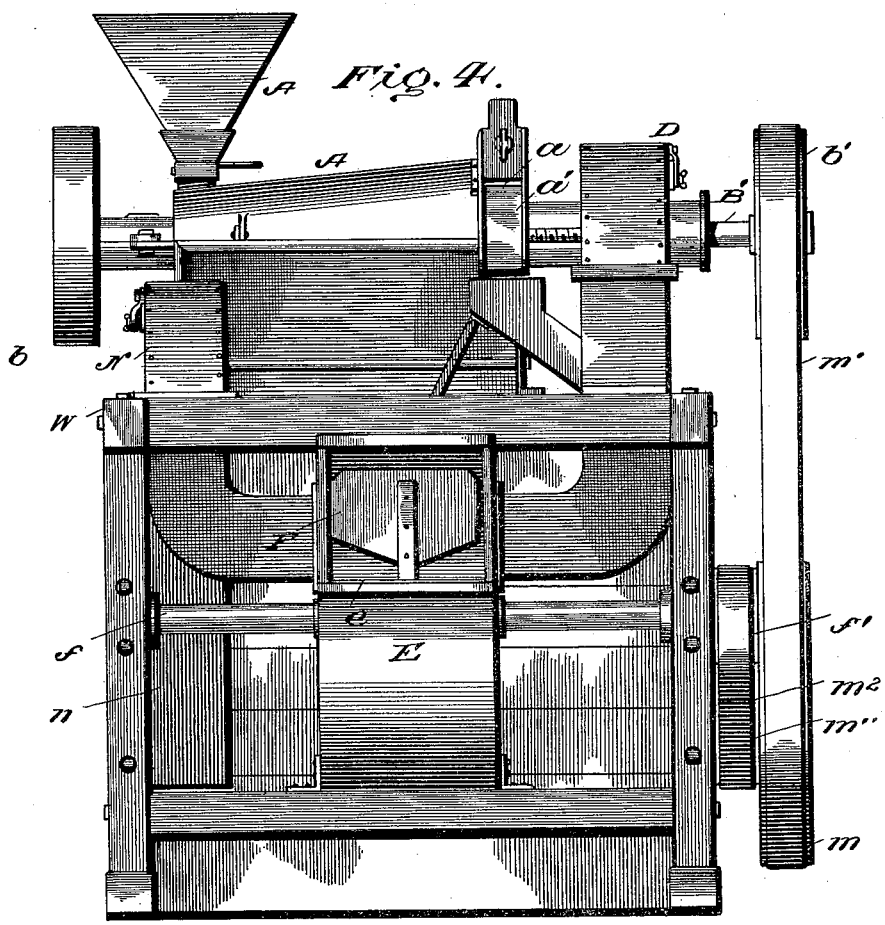
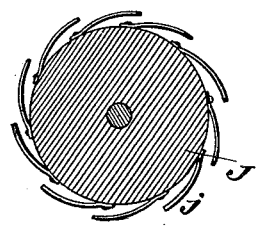
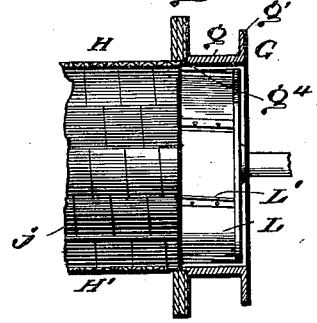
Witnesses
Inventor
Herman A. Barnard
by Alexander & Dowell
his Attorneys No. 606,909. Patented July 5, 1898.
H. A. BARNARD.
RICE HULLING AND POLISHING MACHINE.
(Application filed Sept. 18, 1897.)
(No Model.) 5 Sheets—Sheet 5.

Witnesses

Inventor
Heman A. Barnard
by Alexander & Dowell
his Attorneys

UNITED STATES PATENT OFFICE.

HEMAN A. BARNARD, OF MOLINE, ILLINOIS, ASSIGNOR TO THE BARNARD & LEAS MANUFACTURING COMPANY, OF SAME PLACE.

RICE HULLING AND POLISHING MACHINE.

SPECIFICATION forming part of Letters Patent No. 606,909, dated July 5, 1898.

Application filed September 13, 1897. Serial No. 651,524. (No model.)

*To all whom it may concern:*

Be it known that I, HEMAN A. BARNARD, of Moline, in the county of Rock Island and State of Illinois, have invented certain new and useful Improvements in Rice Hulling and Polishing Machines; and I hereby declare that the following is a full, clear, and exact description thereof, reference being had to the accompanying drawings, which form part of this specification.

This invention is an improvement in machines for hulling and polishing rice, adapted to clean the rice ready for market at one operation, and especially designed for plantation use.

The hulling operation is preferably performed by mechanism already patented to me in United States Patent No. 586,090, dated July 13, 1897; and the present invention relates more particularly to the polishing and screening mechanism.

The invention therefore consists in the novel construction and combination of parts hereinafter claimed, and the accompanying drawings illustrate a machine embodying my invention in the best form now known to me.

Figure 1:
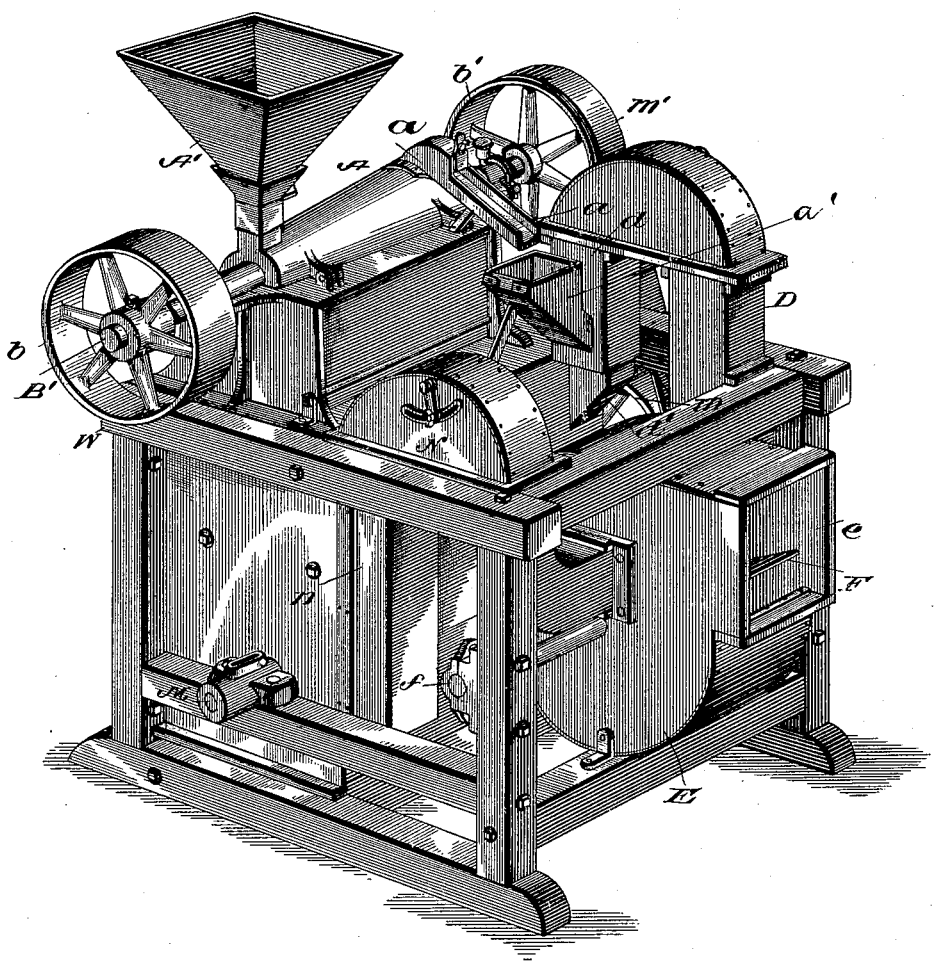
Figure 3:
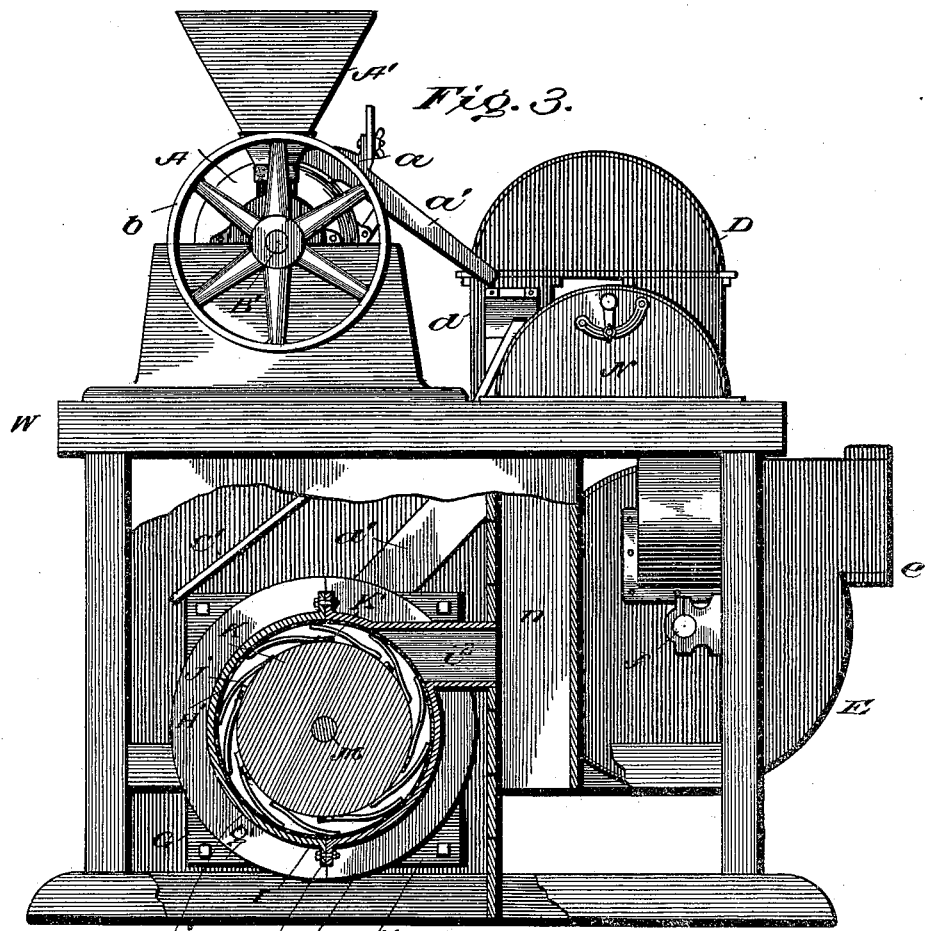
Figure 8:
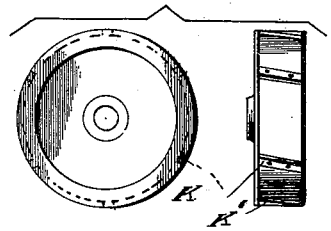
Figure 9:
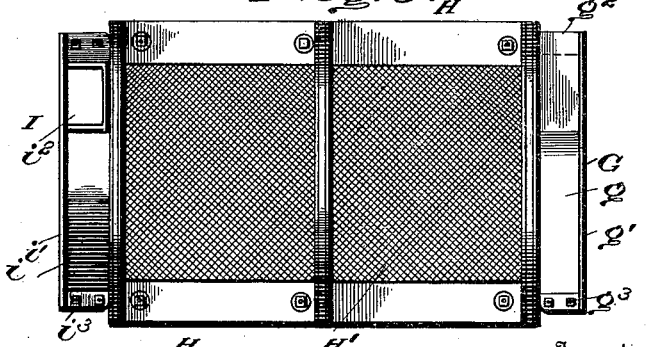
Figure 5:
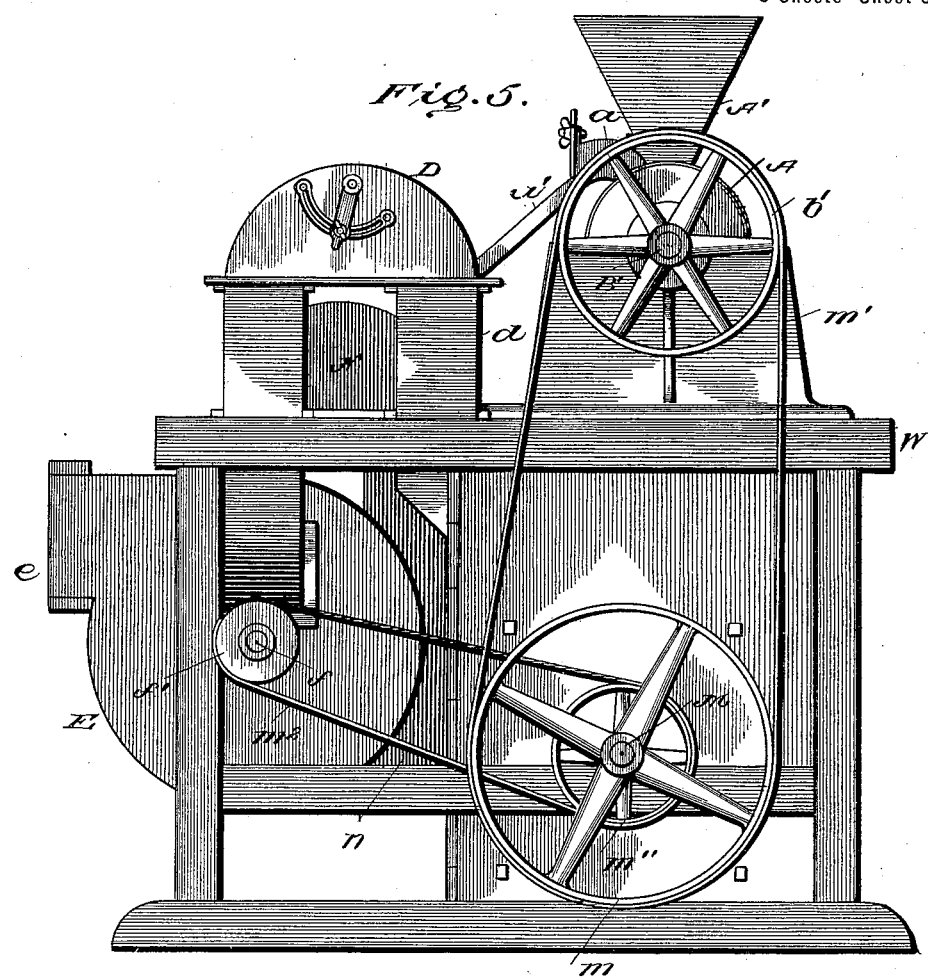
Figure 10:
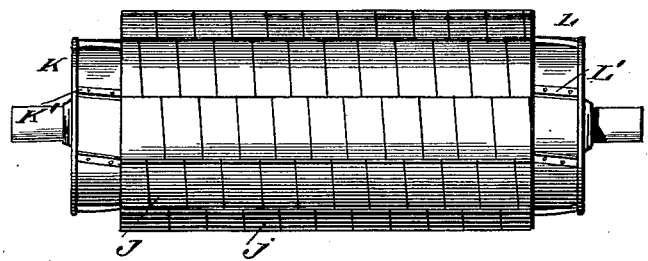

Referring to said drawings, Figure 1 is a perspective view of my complete plantation-mill for hulling and polishing rice. Fig. 2 is an elevation, partly in section, of one end of the machine. Fig. 3 is a similar elevation of the other end of the machine, partly in section. Fig. 4 is a rear side elevation of the machine, partly in section. Fig. 5 is an end view showing the drive of the mill. Figs. 6 and 7 are detail views of the metal heads of the screen-casing. Fig. 8 represents detail front and side views of one of the ends of the polishing-drum. Fig. 9 is a detail view of the polisher-casing detached. Figs. 10 and 11 are side and sectional views of the polishing-drum detached. Fig. 12 is a detail view of the discharging portion of the polisher.

Referring to said drawings by letters, A designates the rice-huller, constructed substantially as shown and described in my aforesaid patent, to which I refer for more particular description thereof. Said huller is mounted upon a stout frame W, supporting and containing the remainder of the apparatus. The huller has a feed-hopper A' at one end and a discharge $a$ at the other, a cone B, mounted on a driven shaft B', and a bottom screen C, below which is a chute-board C', by which the scourings from the huller are discharged to one side of the frame W, as indicated in the drawings. The hulled and scoured rice is discharged through $a$ into a spout $a'$, which conducts it into one leg $d$ of an inverted-U-shaped air-trunk D, and it falls through leg $d$ onto a spout $d'$, by which it is led into the receiving-mouth $g^2$ in one end of the polishing-casing, hereinafter described. The other leg of trunk D leads into a fan-casing E, in which is a fan F, mounted on a shaft $f$, journaled in suitable bearings attached to the rear uprights of frame W, as shown. The fan is so rotated as to draw a current of air through trunk D in such direction as to subject the rice falling through leg $d$ to an upward current of air, by which lighter impurities are separated from the rice and discharged through the mouth $e$ of fan-casing E into the room or into a suitable conductor or receiver. (Not shown.)

The polishing-casing is constructed of four parts—to wit, a receiving-head G, opposite semicylindrical frames H H, and a discharge-head I. The head G (see Fig. 6) is parted vertically, and each half has a semicylindrical flange $g$, projecting from a square or rectangular base portion $g'$, and in one flange $g$ is a vertical receiving-mouth $g^2$, as shown. At the meeting ends of flanges $g$ are short vertical flanges $g^3$, perforated for the passage of securing-bolts, as shown, by which the parts of the heads are united. The head I is constructed similarly to head G, (see Fig. 7,) with base $i'$, semicircular flanges $g$, and vertical uniting-flanges $i^3$. One part of head I is provided with a discharge-spout $i^2$, which is arranged horizontally instead of vertically. The frames H are preferably made of wood, parted on vertical lines, and united by bolts, being provided with wire or reticulated metal screens H', as shown. The polishing-casing lies directly under chute C'. Heads G I are secured in place by bolting portions $g'$ $i'$ to the ends of the casing W, as shown. H H are supported on the opposite heads, being bolted together, so that their ends embrace and clamp annular flanges $g^4$ $i^4$ on the inner ends of heads G and I, as shown. This construction of polishing-casing is simple and durable and facilitates cleaning thereof and repairing of worn parts.

Within the polisher-casing is the polishing-drum, which is also composed of three principal parts—to wit, a cylindrical body J, preferably of wood, and metal heads K and L at the ends thereof, as shown, the heads being fastened on a supporting-shaft M, which extends axially therethrough and is journaled in suitable bearings on frame W outside the polisher-casing, as shown. Head L fits within the part G of the casing and is provided with inclined feed-blades L' on its periphery. Head K fits within part I of the casing and is provided with inclined discharge blades or ribs K' on its periphery, as shown. The surface of body J is covered or shingled with leather straps $j$, as shown, which effect the polishing of the rice as it passes through the polishing-casing from mouth $g^2$ to discharge-spout $i^2$. The operation of the polisher will be readily understood by those familiar with the art.

The discharge-spout $i^2$ leads the cleaned grain into the lower end of one leg $n$ of an inverted-U-shaped air-trunk N, the other end of which leads into the fan-casing E, as shown at the side opposite leg D. The polished rice falling through leg $n$ is discharged into any suitable receiver or conductor, while the dust, scourings, &c., are sucked up through leg $n$ and discharged through the fan-casing.

The screenings falling through screens H' are collected upon the floor or in a suitable receiver, and, if desired, may be kept separate from the scourings discharged from the huller.

Both air-trunks D and N are provided with usual regulating-valves, as indicated in the drawings.

Power is applied to pulley $b$ on shaft B'. It is transmitted from a pulley $b'$ on shaft B' through a belt $m'$ to a pulley $m$ on shaft M and from a pulley $m'$ on shaft $m$ through belt $m^2$ to a pulley $f'$ on shaft $f$, as indicated in Fig. 5 of the drawings.

From the foregoing it will be seen that the rice fed into hopper A' is hulled and then discharged into trunk D, where it is subjected to an air-blast. Thence it passes into the polisher, where it is further abraded, cleaned, and polished, and finally discharged into air-trunk N, where it is subjected to another air-blast and discharged perfectly clean and polished, while the screenings are discharged onto the floor or into a suitable chute or receptacle, and the dust from the trunks is discharged from the fan-casing.

Having thus described my invention, what I therefore claim as new, and desire to secure by Letters Patent thereon, is—

1. The herein-described polisher screen-casing, comprising the vertically-divided metal heads each formed of opposite vertically-divided halves provided with projecting semicylindrical flanges on their inner faces, the opposite heads being also respectively provided with inlet and discharge openings in said flanges, said openings being located above the axis of the polisher-casing and semicylindrical screen-frames fitted on and secured to the flanges of said heads, for the purpose and substantially as described.

2. The herein-described screen-casing consisting of the semicylindrical frames H carrying screens H', and the opposite metallic heads I and G each formed of two vertical parts, each part having a semicircular flange on its inner side, head G being also provided with an inlet $g^2$ and head I with an outlet $i^2$, all substantially as and for the purpose described.

3. The herein-described polishing-drum, consisting of a central cylindrical wooden body J shingled with leather straps $j$, and cylindrical metallic heads K and L fitted on the ends of the body and supporting the latter upon the shaft and respectively provided with inclined peripheral feed and discharge ribs or blades K' and L', for the purpose and substantially as described.

4. The combination with a polisher, having inlet and discharge openings, a fan-casing beside the polisher, a pair of inverted-U-shaped air-trunks respectively located on opposite sides of the fan-casing and beside the feed and discharge ends of the polisher, one leg of each air-trunk communicating with the fan-casing, and one leg of one air-trunk communicating with a spout leading to the feed-inlet of the polisher, and one leg of the other air-trunk communicating with the discharge-outlet of the polisher; said discharge-outlet being at one side of the polisher-casing and above the axis thereof with means for introducing grain to be polished into the leg of the air-trunk communicating with the feed-opening of the polisher, all constructed and arranged, substantially as described.

5. The combination of a polisher having a cylindrical wire screen and hollow heads respectively having inlet and discharge openings, a fan-casing beside the polisher, a pair of inverted-U-shaped air-trunks respectively located on opposite sides of the fan-casing and beside the feed and discharge ends of the polisher, one leg of each air-trunk communicating with the fan-casing, and one leg of one air-trunk communicating with a spout leading to the feed-inlet of the polisher, and one leg of the other air-trunk communicating with the discharge-outlet of the polisher, said discharge-outlet being at one side of the polisher-casing and above the axis thereof; with means for introducing grain to be polished into the leg of the air-trunk communicating with the feed-opening of the polisher, all constructed and arranged, substantially as described.

In testimony that I claim the foregoing as my own I affix my signature in presence of two witnesses.

HEMAN A. BARNARD.

In presence of—
J. S. LEAS,
A. H. JOSEPH.